United States Patent [19]
Frommelt et al.

[11] 3,792,559
[45] Feb. 19, 1974

[54] LOADING DOCK SHELTERS

[75] Inventors: Cyril P. Frommelt; Sylvan J. Frommelt, both of Dubuque, Iowa

[73] Assignee: Dubuque Awning & Tent Company, Dubuque, Iowa

[22] Filed: Aug. 30, 1972

[21] Appl. No.: 285,052

[52] U.S. Cl. .................................... 52/173, 52/288
[51] Int. Cl. ......................... E04f 10/04, E06b 1/56
[58] Field of Search ............... 52/173, 288; 135/5 A

[56] References Cited
UNITED STATES PATENTS

| | | | |
|---|---|---|---|
| 3,403,489 | 10/1968 | Frommelt et al. | 52/173 |
| 3,352,314 | 11/1967 | Frommelt et al. | 52/173 |
| 1,958,168 | 5/1934 | Mitchel | 52/288 |
| 3,286,417 | 11/1966 | Dazzo | 52/173 |
| 3,699,733 | 10/1972 | Frommelt et al. | 52/173 |
| 2,878,053 | 3/1959 | Yuncker | 52/288 X |
| 3,613,324 | 10/1971 | Conger | 52/173 |

*Primary Examiner*—Alfred C. Perham
*Attorney, Agent, or Firm*—Root & O'Keeffe

[57] ABSTRACT

A loading dock shelter embodying a cover member with a resilient pad forming the bottom wall thereof and holding the lower portion of the cover in operative position, the pad being tapered in shape and the upper wall thereof sloping downwardly and inwardly toward the center of the shelter.

10 Claims, 4 Drawing Figures

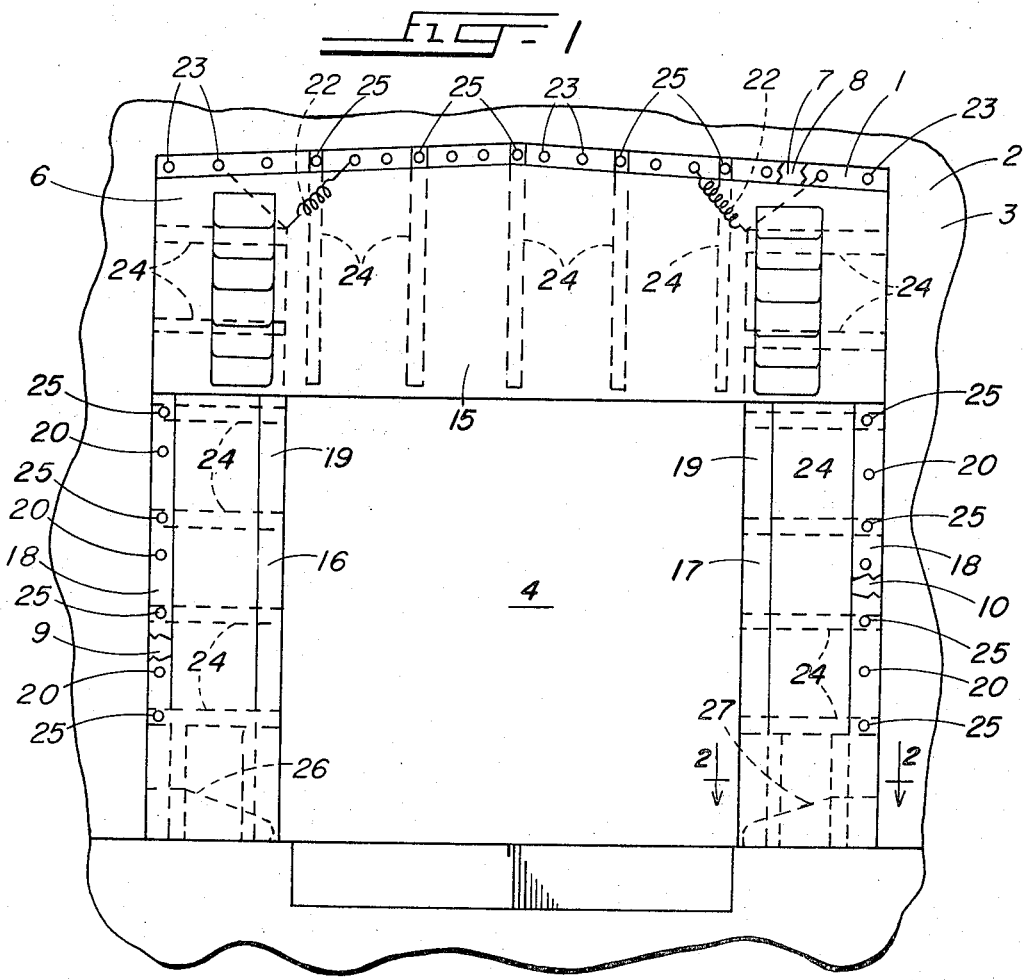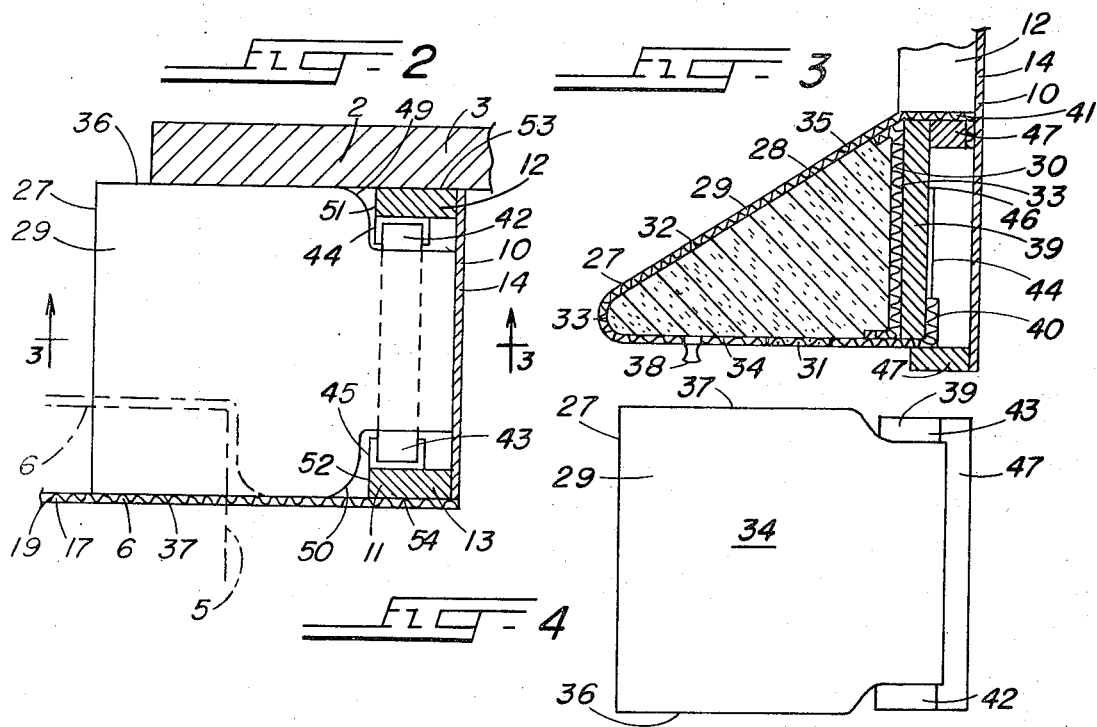

LOADING DOCK SHELTERS

BACKGROUND OF THE INVENTION

This invention relates to loading dock shelters, and, more particularly, to loading dock shelters that are particularly well adapted for use as truck dock shelters.

It is a primary object of the present invention to afford a novel loading dock shelter.

Loading dock shelters of the retractable type and embodying resilient pads at the bottom thereof, such as, for example, loading dock shelters of the type shown in our U.S. States Letters Patent No. 3,352,314, have been heretofore known in the art.

In addition, loading dock shelters of the type embodying rigid frames, with cover members disposed in operative position thereon to by yieldingly held in sealing engagement with the tops and sides of trucks operatively engaged therewith, such as, for example, loading dock shelters of the type shown in our United States Letters Patent No. 3,403,489, have also been known in the art. In these latter shelters, the bottoms thereof commonly have either been open or have been closed by fabric, bottom wall panels, and the like. In some instances, these bottom wall panels have had spring stays embodied therein, for resiliently urging the latter toward normal, outwardly projecting operative position, such as, for example, the bottom panel shown in our aforementioned U.S. Pat. No. 3,403,489.

Also, loading dock shelters of the type embodying a cover member carried by a rigid supporting frame, with a resilient pad forming the bottom wall thereof and holding the lower portion of the cover in operative position, such as, for example, loading dock shelters of the type shown in our copending application for United States Letters Patent, Ser. No. 85,610, filed Oct. 30, 1970, now U.S. Pat. No. 3,699,733, have been heretofore known in the art.

Loading dock shelters of the aforementioned previously known types have been highly successful and afford effective shelter for man and materials during the loading and unloading of a truck, through a warehouse door equipped with such shelters. Also, loading dock shelters of both of the aforementioned types afford effective, automatic sealing engagement between the shelters and the trucks operatively engaged therewith. However, it is an important object of the present invention to afford novel improvements over loading dock shelters heretofore known in the art.

One of the disadvantages of loading dock shelters heretofore known in the art of the type which embody cover side panels disposed in operative spaced relation to a warehouse wall, or the like, with the bottom wall, either of the panel type or of the pad type, disposed between the warehouse wall and the side panels, has been that material which is dropped or spilled on such bottom walls tends to accumulate thereon. This problem is particularly troublesome when the loading dock shelter is being used in connection with a doorway through which a transported loose organic material, such as fresh vegetables or garbage, and the like. It is another important object of the present invention to overcome such disadvantages.

Another object of the present invention is to afford a novel loading dock shelter embodying pads adapted to be disposed at opposite sides of a warehouse doorway, and the like, and affording a bottom wall structure for the shelter, wherein the pads are constituted and arranged in a novel and expeditious manner effective to cause material deposited thereon to be automatically discharged therefrom.

Another object of the present invention is to afford a novel loading dock shelter embodying a novel, compressible resilient bottom wall which is constituted and arranged in a novel and expeditious manner.

Yet another object of the present invention is to afford a novel loading dock shelter of the type embodying a cover member having side panels in outwardly spaced relation to a warehouse wall, or the like, and wherein improved "wrap-around" engagement of the side panels with a truck backed thereagainst is afforded in a novel and expeditious manner.

A further object is to afford a novel loading dock shelter of the type embodying resilient compressible pads adapted to be mounted on opposite sides of a warehouse doorway, and the like, between the wall of the warehouse and the lower end portions of outwardly spaced side panels of a cover member, wherein the pads embody a novel tapered cross sectional shape, parallel to the side panels, with the pads being narrower at their edge portions disposed adjacent to the warehouse door as compared to the edge portions remote therefrom, so as to promote effective, improved wrap-around engagement of the side panels with a truck backed into operative position thereagainst.

Another object of the present invention is to afford a novel loading dock shelter which is practical and efficient in operation and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a front elevational view of a loading dock shelter embodying the principles of the present invention, showing the shelter mounted on a warehouse wall;

FIG. 2 is a fragmentary, detail sectional view taken substantially along the line 2—2 in FIG. 1;

FIG. 3 is a detail sectional view taken substantially along the line 3—3 in FIG. 2; and FIG. 4 is a bottom plan view of the pad shown in FIGS. 2 and 3.

DESCRIPTION OF THE EMBODIMENT SHOWN HEREIN

A loading dock shelter 1 embodying the principles of the present invention is shown in the drawings to illustrate the presently preferred embodiment of the present invention. The loading dock shelter 1 is of the rigid supporting frame type, and is shown herein mounted on an outer wall 2 of a warehouse 3 in surrounding relation to a doorway 4 in the warehouse wall 2, FIG. 1. As will be discussed in greater detail presently, it is operable to afford an effective shelter between a truck 5, diagrammatically shown in FIG. 2, and the doorway 4, when the truck 5 is disposed in normal operative position relative to the doorway 4 for loading and unloading operations to be effected through the rear end of the truck 5 and the doorway 4.

The loading dock shelter 1 embodies, in general, a front cover 6 mounted on a supporting frame 7 in such position that the cover 6 is disposed outwardly of the wall 2 of the warehouse 3 in position to be operatively engaged by a truck, such as the truck 5, as will be discussed in greater detail presently.

Like the loading dock shelter shown in the aforementioned U.S. Pat. No. 3,699,733, the supporting frame 7 includes an elongated top wall 8 extending across the top of the doorway 4, and two elongated side walls 9 and 10, which extend downwardly from respective opposite ends of the top wall 8. Preferably, each of the walls 8-10 is of the same construction as that of the corresponding walls shown in the aforementioned U.S. Pat. No. 3,699,733, each embodying an elongated frame 11, which includes two side members 12 and 13 extending the length thereof, with a cover member 14 mounted on the outer face of the frame 11, as illustrated in FIGS. 2 and 3 with respect to the side wall 10. Each of the respective cover members 14 completely cover the outer face of the respective walls 8-10, and is preferably made of a single, self-supporting panel of a suitable water-impermeable, light permeable material, such as, for example, a translucent sheet of material comprising a composition of a resin reinforced with glass fibers, readily available on the market. They are secured to the respective frames 11 by suitable means such as nails, or cement, not shown.

The supporting frame 7 may be secured to the wall 2 of the warehouse 3 by suitable means such as bolts or screws, not shown, inserted through the side members 12 of the respective frames 11, to thereby secure the supporting frame 7 in operative position on the wall 2, with the side members 13 disposed in outwardly spaced, substantially parallel relation thereto.

The cover 6, which is mounted on the supporting frame 7 in outwardly spaced relation to the warehouse 3, embodies a head curtain or top panel 15 and two side curtains or side panels 16 and 17, FIG. 1. The panels 15-17 may be made of any suitable material, but preferably they are made of a water-repellent, wear-resistant material, such as, for example, canvas duck or rubber-impregnated nylon fabric.

Each of the side curtains or side panels 16 and 17 is substantially rectangular in shape, and includes an outer longitudinally extending edge portion 18 and an inner longitudinally extending edge portion 19, FIG. 1. The outer longitudinal edge portions 18 of the side curtains 16 and 17 are directly attached to the top wall 8, and the inner edge portions thereof taper downwardly and are yieldingly connected to the top wall 8 by respective tension coil springs 22, FIG. 1.

The head curtain or top panel 15 of the cover 6 is elongated in a horizontal direction, and is attached along its upper longitudinal edge to the top wall 8 of the supporting frame 7 by suitable means such as screws or bolts 23. The head curtain 15 extends across the entire width of the loading dock shelter 1, and hangs downwardly from the top wall 8 of the supporting frame 7 forwardly of, but in closely adjacent relation to the side panels 16 and 17.

In mounting the loading dock shelter 1 in operative position on the warehouse 3, the top wall 8 preferably is secured to the wall 2 of the warehouse 3 by suitable means such as the aforementioned bolts or screws, not shown, in such position that it is disposed above the doorway 4 in substantially parallel relation thereto. After the top wall 8 and head curtain 15 have thus been mounted in operative position on the warehouse 3, the side walls 9 and 10, and the side curtains 16 and 17 carried thereby, are next preferably secured to the top wall 8, and the side walls 9 and 10 may then be secured to the wall 2 of the warehouse 3 by inserting bolts or screws, not shown, through the longitudinal members 12 of the frames 11 thereof.

When the loading dock shelter 1 is thus secured in operative position on the wall 2 of the warehouse 3, the side walls 9 and 10 of the supporting frame 7 are disposed laterally outwardly of the side jambs of the doorway 4 in such position that the side curtains 16 and 17 project across the adjacent portions of the doorway 4 in such position that when a truck, such as the truck 5, is disposed in the aforementioned operative position relative to the doorway 4 for loading and unloading operations, the side panels 16 and 17 engage the respective adjacent sides of the rear end of the truck 5; and the head curtain 15 is disposed in such position that it projects downwardly below the plane of the top of the doorway 4 in position to drape itself across the top of the rear end of the truck 5.

As in the loading dock shelter shown in the aforementioned U.S. Pat. No. 3,699,733, each of the panels 15-16 of the cover 6 embodies a plurality of elongated stays 24 extending thereacross in substantially parallel relation to each other, FIG. 1. The stays 24 may be made of any suitable resilient material, such as, for example, spring steel, and are so disposed in each of the panels 15-17 of the loading dock shelter 1 that they yieldingly urge each of the panels 15-17 to remain in their normal, at-rest position, wherein they extend across the front of the doorway, in substantially parallel relation thereto. In such position, the side curtains 16 and 17 are preferably disposed in uniplanar relation to each other and the top panel 15 projects substantially vertically downwardly across the upper portion of the doorway 4, forwardly of the side panels 16 and 17.

The outer ends of each of the stays 24 are secured by nails or screws 25 to the front frame members 13 of the respective walls 8-9 to which the cover panels 15-17 are secured.

The loading dock shelter 1 shown herein embodies two resilient, compressible cushions 26 and 27, FIG. 1, which afford bottom walls for the cover 6. The cushions 26 and 27 are identical in construction, except that they are reverse or mirror images of each other.

As illustrated in FIGS. 2 and 4 with respect to the cushion 27, each of the cushions 26 and 27 is elongated in a direction projecting outwardly from the warehouse wall 2, and each is tapered in transverse cross section. Each of the cushions 26 and 27 embodies a substantially rectangular-shaped resilient pad 28 closely covered by a complementary, wear-resistant casing 29, FIG. 2. The pads 28 may be made of any suitable material, such as, for example, any suitable natural or synthetic, compressible, resilient resin or polymer, our preferred material being a foamed polyether. Similarly, the casings 29 may be made of any suitable material, but preferably are made of a flexible water-repellant, wear-resistant material, such as, for example, the aforementioned canvas duck or rubber-impregnated nylon fabric.

Each of the pads 28 embodies a substantially flat outer face or side 30, a substantially flat lower face or side 31, projecting from the lower edge of the outer face 30 in substantially perpendicular relation to the latter, and an upper face or side 32 sloping downwardly from the upper edge of the outer face 30 and terminating at its lower edge in a rounded, longitudinal inner edge 33 of the pad 28.

As previously mentioned, the casing or cover 29 is disposed in relatively close fitting relation to the pad 28. It embodies a rear wall 33, a bottom wall 34 and a top wall 35 disposed in parallel juxtaposition to the sides 30–32, respectively, of the pad 28. End walls 36 and 37, FIG. 2, of the casing 29 complete the enclosure of the pad 28. Preferably, each of the casings 29 has an opening in the bottom wall 34 thereof through which the pad 28 may be inserted into and removed from the casing 29, so that the pads 28 are readily replaceable, the opening preferably being normally held in close position by suitable releaseable means, such as, for example, a zipper 38, FIG. 3.

Each of the cushions 26 and 27 also includes an elongated backing member 39, made of suitable material, such as, for example, wood. The backing member 39 is disposed in substantially parallel, abutting engagement with the rear face of the rear wall 33 of the respective casing 29. Each of the casings 29 embodies two flaps 40 and 41 projecting rearwardly from the lower wall 34 and the upper wall 35 thereof, respectively. The flap 40 extends across the lower edge of the backing member 39 and upwardly on to the rear face thereof, where it is secured to the backing member 39 by suitable means such as nails or screws, not shown. Similarly, the flap 41 extends across the upper edge of the backing member 39 and downwardly along the rear face thereof, where it is secured to the backing member 39 by suitable means such as the aforementioned nails or screws, not shown. Thus the pad 28 and the cover 29 of each of the cushions 26 and 27 is secured from the respective backing members 39 in cantilever fashion by the flaps 40 and 41. The flaps 40 and 41 are somewhat shorter in length than the backing members 39, and are centered thereon, so that the ends 42 and 43 of each of the backing members 39 project outwardly therefrom, for a purpose which will be discussed in greater detail presently.

Two supporting brackets 44 and 45 are mounted on and secured to the lower end portions of the adjacent faces of the side members 12 and 13, respectively, of each of the frames 11 embodied in the side walls 9 and 10 of the supporting frame 7. All of the supporting brackets 44 and 45 are identical in construction, each embodying an elongated, substantially U-shaped channel member, FIG. 2, which is open at the top 46 thereof, and which rests on and is closed at the bottom by a bottom cross member 47 which extends between the side members 12 and 13 in each of the frames 11. Each of the supporting brackets 44 and 45 is of such internal size and shape as to snugly receive one of the ends 42 or 43, respectively, of the backing members 39, when the latter is inserted laterally downwardly through the upper end thereof.

The supporting brackets 44 and 45 are disposed in parallel relation on the side members 12 and 13 of the respective side frame members with the open sides thereof directly facing toward each other, and with the brackets 44 and 45 preferably disposed in closely adjacent relation to the inner edges of the respective side members 12 and 13. The backing members 39 are of such length that when they are disposed in parallel relation to the outer panels 14 of the side walls 9 and 10, the ends 42 and 43 thereof may be inserted downwardly into the supporting brackets 44 and 45 into position wherein they rest on the cross members 47 so as to support the pads 28 and casings 39, in the manner of a cantilever, in horizontally extending position between the warehouse wall 2 and the side panels 16 and 17, respectively, of the cover 6.

In the preferred form of the invention as shown in the drawings, each of the backing members 39 includes a projection 47 extending along, and projecting outwardly from the upper edge thereof, the projection 47 extending the full length of the backing member 39. The projections 47 are of such horizontal width that, when the backing members 39 are disposed in operative position in the brackets 44 and 45, the outer edges of the projections 47 are disposed in closely adjacent relation to the outer panels 14 of the respective side walls 9 and 10, FIG. 3, to thereby substantially close the side walls 9 and 10 and prevent articles from passing therethrough downwardly past the cushions 26 and 27.

In the preferred form of the invention shown in the drawings, the cushions 26 and 27 are longer than the respective backing members 39 to which they are secured. Preferably, they are of such length that, when the cushions 26 and 27 are disposed in operative position in the side walls 9 and 10, respectively, the end portions 49 and 50 of the rear face of the cushions 29 are disposed in closely adjacent, facing relation to the laterally inwardly faces 51 and 52, respectively, of the side members 12 and 13 of the respective side frame members 11, with the ends 36 and 37 of the cushions 28 and 29 being disposed in substantially uniplanar relation to the outer side faces 53 and 54 of the respective side members 12 and 13, FIG. 2.

With the cushions 26 and 27 constructed in the aforementioned manner, when they are disposed in operative position in the loading dock shelter 1, the downwardly and inwardly sloping walls 35 of the covers 29 affords a correspondingly sloping top for the respective cushions 29. Preferably, the walls 35 are disposed at an angle of between thirty degrees and forty-five degrees, and, preferably, in the nature of forty degrees, to the bottom walls 34 of the perspective covers 29. With such construction, material, such as the aforementioned vegetables or garbage, and the like, which may be accidentally, or otherwise, deposited upon the cushions 26 and 27, will pass downwardly thereacross and be discharged from the inner edges of the cushions.

Also, with this tapered construction of the cushions 29, wherein the inner longitudinal edges thereof are of substantially narrower vertical thickness than the outer longitudinal edges thereof, a highly effective wrap-around engagement is afforded between the rear end portion of a truck, such as the truck 5, and the side curtains 16 and 17, the cushions 26 and 27 affording a progressively greater resistance to compression from the inner longitudinal edges thereof to the outer longitudinal edges thereof, so that they tend to hold the side curtains 16 and 17 in closely adjacent relation to the sides of the rear end portion of a truck operatively engaged therewith, as illustrated diagrammatically in FIG. 2.

From the foregoing it will be seen that the present invention affords a novel loading dock shelter.

In addition, it will be seen that the present invention affords a novel loading dock shelter embodying a novel pad structure constituted and arranged in a novel and expeditious manner.

Also, it will be seen that the present invention affords a novel loading dock shelter which is practical and efficient in operation and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. A loading dock shelter comprising
   a. a front cover
   b. means for supporting said cover in position to extend along the top and sides of a doorway in a warehouse wall in outwardly disposed relation to said wall,
   c. said cover including two flexible side panels mounted on said supporting means in position to extend downwardly from said top panel along respective sides of said doorway and extend horizontally toward each other in position to sealingly engage the sides of a truck backed into operative position relative to said doorway for loading and unloading of said truck, and
   d. means for holding the lower portions of said side panels in outwardly spaced relation to said wall,
   e. said last mentioned means comprising two resilient cushion means mounted between said warehouse and the lower end portion of a respective one of said side panels,
   f. each of said cushion means having
      1. an inner edge facing toward the other of said cushion means, and
      2. an upper surface sloping upwardly and outwardly away from said inner edge.

2. A loading dock shelter as defined in claim 1, and in which
   a. each of said cushion means is vertically narrower at said inner edge than at the edge thereof remote from said inner edge.

3. A loading dock shelter as defined in claim 1, and in which
   a. the bottom of each of said cushion means extends substantially horizontally from said inner edge thereof.

4. A loading dock shelter as defined in claim 1, and which includes
   a. other supporting means disposed on opposite sides of said doorway, and
   b. supporting members
      1. carried by said cushion means, and
      2. removably mounted in said other supporting means for supporting said cushion means in such position between said warehouse and said side panels.

5. A loading dock shelter as defined in claim 1, and in which
   a. each of said cushion means comprises
      1. a pad of resilient compressible material,
      2. a backing member disposed at the side of said pad remote from said inner edge, and
      3. another cover mounted on said pad and secured to said backing member for supporting said pad from said backing member.

6. A loading dock shelter comprising
   a. a cover comprising
      1. a top panel extending along the top of a doorway in a warehouse wall, and
      2. two side panels extending downwardly from said top panel along respective sides of said doorway,
   b. means mounted on said warehouse wall for supporting said top panel and said side panels in outwardly spaced relation to said wall, and
   c. two cushions mounted on opposite sides of said doorway in engagement with the lower end portions of respective ones of said side panels for yieldingly holding said side panels in outwardly spaced relation to said walls,
   d. each of said cushions
      1. having an inner edge facing toward the other of said cusions,
      2. having a top wall portion sloping upwardly and outwardly away from said inner edge, and
      3. being vertically narrower at said inner edge than at the side thereof remote from said inner edge.

7. A loading dock shelter comprising
   a. a cover comprising
      1. a top panel extending along the top of a doorway in a warehouse wall, and
      2. two side panels extending downwardly from said top panel along respective sides of said doorway,
   b. a supporting frame mounted on said warehouse wall for supporting said cover in outwardly spaced relation to said warehouse wall,
   c. said frame having two elongated side walls
      1. extending longitudinally along respective sides of said doorway, and
      2. projecting laterally outwardly therefrom,
   d. said side panels being attached to the outer longitudinal edges of respective ones of said side walls and projecting laterally toward each other, and
   e. means for yieldingly holding the lower portion of said side panels in outwardly spaced relation to said warehouse wall,
   f. said means comprising two cushions
      1. mounted on opposite sides of said doorway between said side walls, and
      2. disposed in engagement with said warehouse wall and respective ones of said side panels,
   g. each of said cushions having
      1. an inner edge facing toward the other of said cushions, and
      2. a top wall sloping upwardly and outwardly away from said inner edge in a direction away from said other cushion.

8. A loading dock shelter as defined in claim 7, and in which
   a. each of said cushions comprises
      1. a pad of resilient compressible material, 2. another cover mounted on said pad, and
3. means attached to said other cover for supporting said pad between said side walls.

9. A loading dock shelter as defined in claim 7, and in which
  a. each of said cushions comprises
    1. a pad of resilient compressible material,
    2. a backing member disposed on said pad on the side thereof remote from said inner edge, and
    3. another cover mounted on said pad and secured to said backing member for supporting said pad from said backing member,
  b. the vertical thickness of each of said cushions in less at said inner edge than at the side thereof remote from said inner edge.

10. A loading dock shelter as defined in claim 9, and which includes
  a. mounting brackets mounted on opposite sides of said doorway and operatively engaged with respective ones of said backing members for supporting said cushions between said side walls.

* * * * *

PO-1050
(5/69)

UNITED STATES PATENT OFFICE
CERTIFICATE OF CORRECTION

Patent No. 3,792,559   Dated February 19, 1974

Inventor(s) Cyril P. Frommelt and Sylvan J. Frommelt

It is certified that error appears in the above-identified patent and that said Letters Patent are hereby corrected as shown below:

Column 1, line 17, "by" should be -- be --;

line 60, "a" should be -- is -- ;

Column 10, line 2, "in" should be -- is -- .

Signed and sealed this 2nd day of July 1974.

(SEAL)
Attest:

EDWARD M. FLETCHER, JR.
Attesting Officer

C. MARSHALL DANN
Commissioner of Patents